(12) United States Patent
Sutani et al.

(10) Patent No.: US 9,729,040 B2
(45) Date of Patent: Aug. 8, 2017

(54) MAGNETIC GEAR DEVICE HAVING A PLURALITY OF MAGNETIC BODIES ARRANGED IN A PARTICULAR CONFIGURATION

(75) Inventors: Junichi Sutani, Suita (JP); Hiromitsu Ohhashi, Suita (JP); Masahiro Mita, Takasaki (JP)

(73) Assignee: Hitachi Metals, Ltd., Tokyo (JP)

( * ) Notice: Subject to any disclaimer, the term of this patent is extended or adjusted under 35 U.S.C. 154(b) by 689 days.

(21) Appl. No.: 14/232,183

(22) PCT Filed: Jun. 27, 2012

(86) PCT No.: PCT/JP2012/066329
§ 371 (c)(1),
(2), (4) Date: Jan. 10, 2014

(87) PCT Pub. No.: WO2013/011809
PCT Pub. Date: Jan. 24, 2013

(65) Prior Publication Data
US 2014/0167546 A1    Jun. 19, 2014

(30) Foreign Application Priority Data
Jul. 15, 2011    (JP) .................................. 2011-156649

(51) Int. Cl.
*H02K 49/10*    (2006.01)
(52) U.S. Cl.
CPC ........... *H02K 49/102* (2013.01); *H02K 49/10* (2013.01)
(58) Field of Classification Search
CPC ............................. H02K 49/10; H02K 49/102
(Continued)

(56) References Cited

U.S. PATENT DOCUMENTS 2,722,617 A * 11/1955 Cluwen ................. H01F 7/0242
310/103
5,402,021 A * 3/1995 Johnson ................. H02K 53/00
198/619
(Continued)

FOREIGN PATENT DOCUMENTS

CN    101495778 A    7/2009
CN    102016358 A    4/2011
(Continued)

OTHER PUBLICATIONS

Mita et al., English Translation of WO 2012014596 A1, Feb. 2, 2012.*
(Continued)

*Primary Examiner* — Joshua Benitez Rosario
*Assistant Examiner* — Rashad Johnson
(74) *Attorney, Agent, or Firm* — Rudy J. Ng; Bret E. Field; Bozicevic, Field & Francis LLP

(57) ABSTRACT

The magnetic gear device is equipped with a first magnet row in which a plurality of magnetic pole pairs are arranged at substantially equal intervals in a specific direction; a second magnet row which is opposed to the first magnet row and in which a plurality of magnetic pole pairs are arranged at substantially equal intervals in the specific direction at a pitch shorter (or longer) than that of the first magnet row; and a magnetic body row which is disposed between the first magnet row and the second magnet row and in which a plurality of magnetic bodies are arranged at substantially equal intervals in the specific direction, wherein a distance between the plurality of magnetic bodies and the second magnet row in the opposing direction is shorter (or longer) than a distance between the plurality of magnetic bodies and the first magnet row.

10 Claims, 17 Drawing Sheets

(58) Field of Classification Search
USPC .................................. 310/98, 99, 75 D, 103
See application file for complete search history.

(56) References Cited

U.S. PATENT DOCUMENTS

| | | | | |
|---|---|---|---|---|
| 5,633,555 | A * | 5/1997 | Ackermann | H02K 49/102 310/103 |
| 5,821,710 | A | 10/1998 | Masuzawa et al. | |
| 8,446,060 | B1 * | 5/2013 | Lugg | H02K 21/024 310/103 |
| 8,546,988 | B2 * | 10/2013 | Bright | H02K 49/102 310/103 |
| 2007/0096574 | A1 | 5/2007 | Romagny et al. | |
| 2007/0296295 | A1 | 12/2007 | Cruz et al. | |
| 2010/0214047 | A1 * | 8/2010 | Sakai | H04R 9/047 335/306 |
| 2011/0037333 | A1 * | 2/2011 | Atallah | H02K 51/00 310/98 |
| 2011/0057456 | A1 | 3/2011 | Atallah et al. | |
| 2011/0121674 | A1 * | 5/2011 | Bright | H02K 49/102 310/103 |
| 2011/0156518 | A1 * | 6/2011 | Bright | H02K 19/106 310/103 |
| 2011/0253498 | A1 * | 10/2011 | Montgomery | H02K 49/102 192/84.3 |
| 2012/0194021 | A1 * | 8/2012 | Nakatsugawa | H02K 49/102 310/103 |
| 2012/0286592 | A1 * | 11/2012 | Bojiuc | H02K 21/24 310/12.24 |
| 2012/0286609 | A1 * | 11/2012 | Kasai | F16D 11/14 310/94 |
| 2013/0002076 | A1 * | 1/2013 | Iwasaki | H02K 49/102 310/103 |
| 2013/0320795 | A1 * | 12/2013 | Enomoto | H02K 49/10 310/103 |
| 2015/0076948 | A1 * | 3/2015 | Katou | H02K 49/102 310/103 |
| 2016/0006304 | A1 * | 1/2016 | Tojima | H02K 1/16 310/154.02 |
| 2016/0241123 | A1 * | 8/2016 | Ohhashi | F16H 49/00 |

FOREIGN PATENT DOCUMENTS

| | | | |
|---|---|---|---|
| JP | 2004022925 A | 1/2004 | |
| JP | 2006105210 A | 4/2006 | |
| JP | 2007-228735 A | 9/2007 | |
| JP | 2008075666 A | 4/2008 | |
| JP | 2008215428 A | 9/2008 | |
| JP | 2008-245488 A | 10/2008 | |
| JP | 2010-223340 A | 10/2010 | |
| JP | 2011-033166 A | 2/2011 | |
| JP | 2011-094742 A | 5/2011 | |
| JP | WO 2012014596 A1 * | 2/2012 | ........... H02K 49/108 |
| WO | WO 2009/087409 A1 | 7/2009 | |
| WO | WO2010109208 A1 | 9/2010 | |

OTHER PUBLICATIONS

Extended European Search Report issued for European application No. 12814557.0 dated Nov. 16, 2015, 8 pages.
Ikeda, et al., "A Way to Improve Efficiency of Permanent-Magnet Magnetic Gears", Journal of the Magnetics Society of Japan, vol. 33, No. 2, p. 130-134 (2009).
Cheng et al., New Electric Driving Control System and Related Technology, p. 189-191, Published by China Machine Press, Beijing, Jun. 30, 2005, ISBN9787111166009.

* cited by examiner

F I G. 2
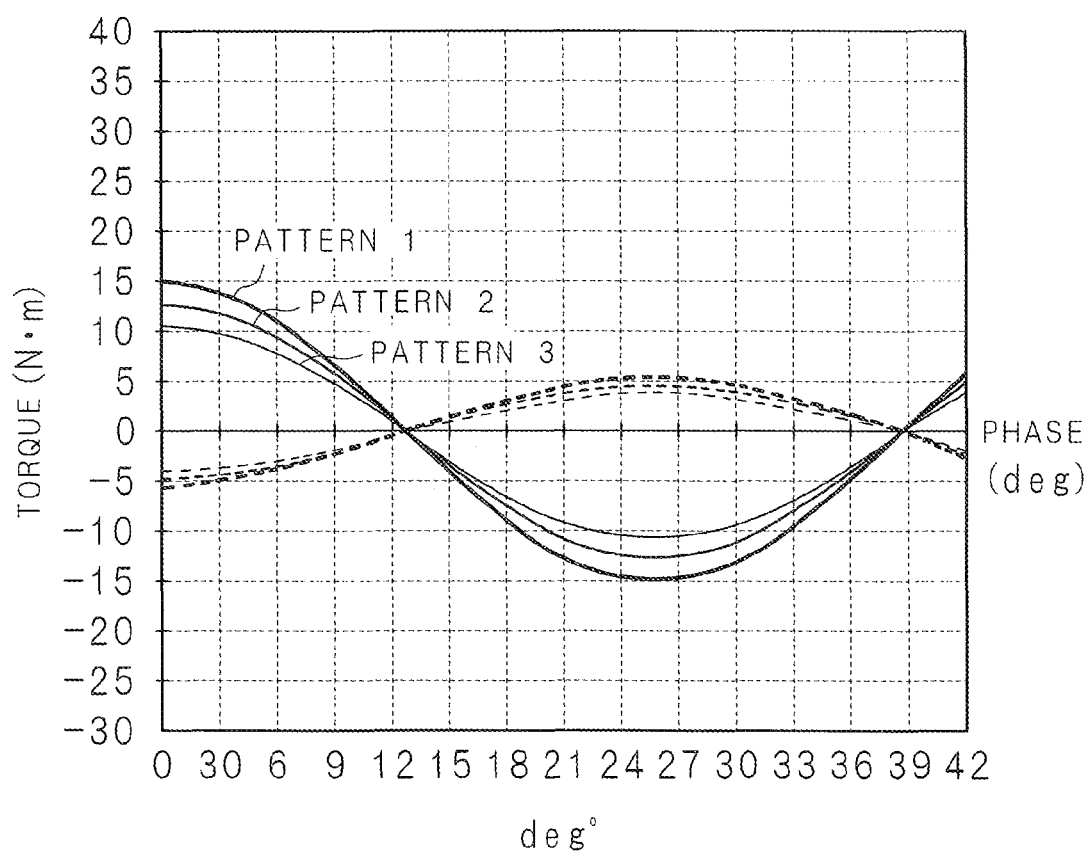

F I G. 4
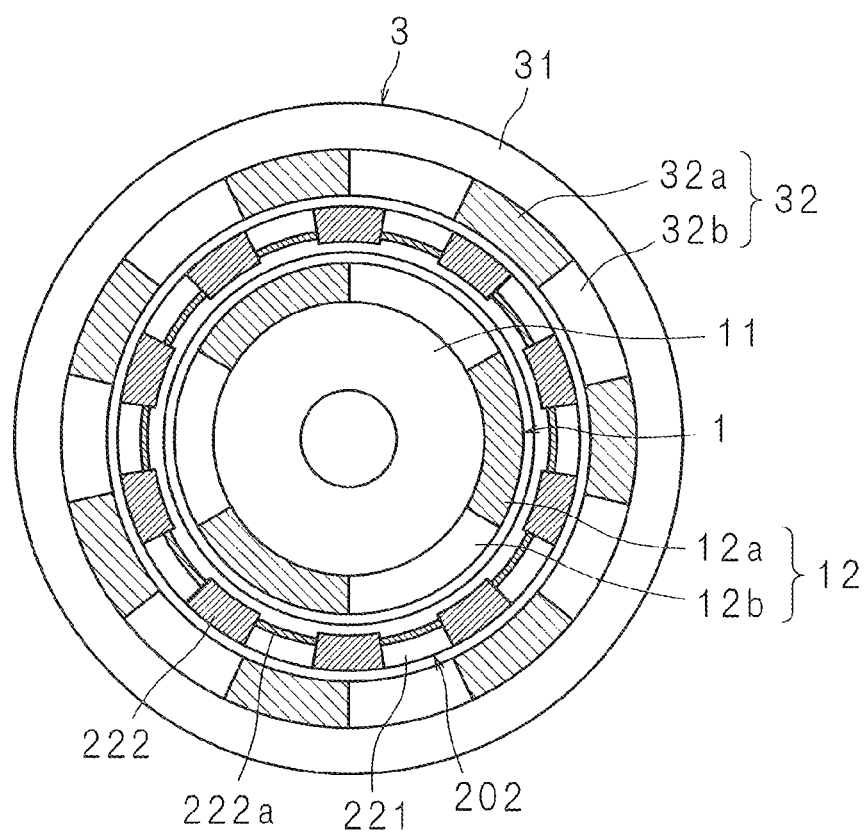

MAGNETIC GEAR DEVICE HAVING A PLURALITY OF MAGNETIC BODIES ARRANGED IN A PARTICULAR CONFIGURATION

CROSS-REFERENCE TO RELATED APPLICATION

This application is the national phase under 35 U.S.C. §371 of PCT International Application No. PCT/JP2012/066329 which has an International filing date of Jun. 27, 2012 and designated the United States of America.

FIELD

The present invention relates to a magnetic gear device equipped with a first magnet row and a second magnet row, in each of which a plurality of magnetic pole pairs are arranged at substantially equal intervals in a specific direction, and a magnetic body row which is disposed between the first magnet row and the second magnet row and in which a plurality of magnetic bodies are arranged at substantially equal intervals in the specific direction.

BACKGROUND

In WO 2009/087409 and a document ("A Way to Improve Efficiency of Permanent-Magnet Magnetic Gears" by Tetsuya Ikeda, Kenji Nakamura and Osamu Ichinokura, Journal of the Magnetics Society of Japan, 2009, Volume 33, No. 2, Pages 130-134), magnetic gear devices are disclosed. These magnetic gear devices are each equipped with a cylindrical first movable member and a cylindrical second movable member, in each of which a plurality of magnetic pole pairs are arranged at substantially equal intervals in the circumferential direction, and a cylindrical intermediate yoke which is disposed between the first movable member and the second movable member and in which a plurality of magnetic bodies are arranged at substantially equal intervals in the circumferential direction. The plurality of magnetic bodies are disposed at the substantially central section of the clearance between the first movable member and the second movable member.

SUMMARY

The inventors of the present application have found a fact that the efficiency of torque transmission is higher in the case that the magnetic bodies of the intermediate yoke are disposed closer to the side of the movable member rotating at low speed than in the case that the magnetic bodies are disposed at the substantially central section of the clearance between the first movable member and the second movable member.

Means for Solving the Problem

A magnetic gear device according to the present invention is equipped with a first magnet row in which a plurality of magnetic pole pairs are arranged at substantially equal intervals in a specific direction; a second magnet row which is opposed to the first magnet row and in which a plurality of magnetic pole pairs are arranged at substantially equal intervals in the specific direction at a pitch shorter (or longer) than that of the first magnet row; and a magnetic body row which is disposed between the first magnet row and the second magnet row and in which a plurality of magnetic bodies are arranged at substantially equal intervals in the specific direction, wherein a distance between the plurality of magnetic bodies and the second magnet row in an opposing direction is shorter (or longer) than a distance between the plurality of magnetic bodies and the first magnet row.

With the present invention, in the case that the first magnet row rotates or moves at high speed and that the second magnet row rotates or moves at low speed, the plurality of magnetic bodies are disposed closer to the side of the second magnet row on the low-speed side than to the side of the first magnet row on the high-speed side. The torque transmitted between the first magnet row and the second magnet row is larger than in the case that the plurality of magnetic bodies are disposed at the substantially central section of the clearance between the first magnet row and the second magnet row as described later.

Similarly, in the case that the first magnet row rotates or moves at low speed and that the second magnet row rotates or moves at high speed, the plurality of magnetic bodies are disposed closer to the side of the first magnet row on the low-speed side than to the side of the second magnet row on the high-speed side. The torque transmitted between the first magnet row and the second magnet row is larger than in the case that the plurality of magnetic bodies are disposed at the substantially central section of the clearance between the first magnet row and the second magnet row as described later. In the case that the clearance between the first magnet row and the second magnet row in the direction being opposed to each other remains the same and that the thickness of the magnetic bodies remains the same; in other words, in the case that the clearance and the thickness are fixed to constant design values, it is preferable that the plurality of magnetic bodies are disposed on the low-speed side.

In the magnetic gear device according to the present invention, the magnetic body row holds the plurality of magnetic bodies and is equipped with a partition for separating the first magnet row from the second magnet row.

With the present invention, since the partition for separating the first magnet row from the second magnet row is provided, the atmosphere on the side of the first magnet row can be separated from the atmosphere on the side of the second magnet row.

In the magnetic gear device according to the present invention, the plurality of magnetic bodies are held in the partition so as to be exposed to a side of the second magnet row (or to a side of the first magnet row).

With the present invention, in the case that the first magnet row rotates or moves at high speed and that the second magnet row rotates or moves at low speed, the magnetic bodies are exposed from the partition of the magnetic body row to the side of the second magnet row. Hence, the distance between the magnetic bodies and the second magnet row can be made as short as possible, and the transmission torque of the device can be improved. Furthermore, the magnetic bodies can be prevented from being exposed to the atmosphere on the side of the first r.

Similarly, in the case that the first magnet row rotates or moves at low speed and that the second magnet row rotates or moves at high speed, the magnetic bodies are exposed from the partition of the magnetic body row to the side of the first magnet row. Hence, the distance between the magnetic bodies and the first magnet row can be made as short as possible, and the transmission torque can be improved.

Furthermore, the magnetic bodies can be prevented from being exposed to the atmosphere on the side of the second magnet row.

In the magnetic gear device according to the present invention, the plurality of magnetic bodies are buried in the partition.

With the present invention, since the magnetic bodies are buried in the partition, the magnetic bodies can be prevented from being exposed to the atmospheres on the sides of the first magnet row and the second magnet row.

In the magnetic gear device according to the present invention, the magnetic body row is equipped with connection sections, each of which is used to connect adjacent ones of the plurality of magnetic bodies with each other, and the plurality of magnetic bodies and the connection sections are integrally formed.

With the present invention, since the plurality of magnetic bodies are connected by the connection sections and the magnetic bodies and the connection sections are integrally formed, the magnetic body row can be arranged easily.

In the magnetic gear device according to the present invention, the distance between the connection section and the first magnet row in the opposing direction is shorter (or longer) than the distance between the connection section and the second magnet row.

With the present invention, in the case that the first magnet row rotates or moves at high speed and that the second magnet row rotates or moves at low speed, the distance between the connection section and the first magnet row in the opposing direction is shorter than the distance between the connection section and the second magnet row, and the connection section is magnetically saturated. Hence, the ratio of an invalid magnetic flux not contributing to the force to be transmitted is reduced.

Similarly, in the case that the first magnet row rotates or moves at low speed and that the second magnet row rotates or moves at high speed, the distance between the connection section and the second magnet row in the opposing direction is shorter than the distance between the connection section and the first magnet row, and the connection section is magnetically saturated. Hence, the ratio of an invalid magnetic flux not contributing to the force to be transmitted is reduced.

In the magnetic gear device according to the present invention, each of the plurality of magnetic bodies includes a laminated steel plate.

With the present invention, eddy current hardly occurs.

In the magnetic gear device according to the present invention, the first magnet row includes sintered magnet (or bonded magnet), and the second magnet row includes bonded magnet (or sintered magnet).

With the present invention, bonded magnets are provided on the low-speed side in which eddy current is liable to occur, and sintered magnets are provided on the high-speed side in which eddy current hardly occurs. Since the magnetic force of the sintered magnet is larger than that of the bonded magnet, the above-mentioned combination can guarantee high transmission torque while suppressing eddy-current loss.

In the magnetic gear device according to the present invention, each of the first magnet row, the second magnet row and the magnetic body row has a cylindrical shape, and the specific direction is a circumferential direction of the first magnet row, the second magnet row and the magnetic body row.

With the present invention, a cylindrical magnetic gear device can be configured.

In the magnetic gear device according to the present invention, each of the first magnet row, the second magnet row and the magnetic body row has a disc shape, and the specific direction is the circumferential direction of the first magnet row, the second magnet row and the magnetic body row.

With the present invention, a disc-shaped magnetic gear device can be configured.

In the magnetic gear device according to the present invention, each of the first magnet row, the second magnet row and the magnetic body row has a long plate shape, and the specific direction is a longitudinal direction of the first magnet row, the second magnet row and the magnetic body row.

With the present invention, a long plate-shaped linear magnetic gear device can be configured.

In the magnetic gear device according to the present invention, each of the first magnet row, the second magnet row and the magnetic body row has a cylindrical shape, and the specific direction is a direction of a central axis of the first magnet row, the second magnet row and the magnetic body row.

With the present invention, a cylindrical linear magnetic gear device can be configured.

Effects of the Invention

According to the present invention, the forces transmitted between the first magnet row and the magnetic body row and between the second magnet row and the magnetic body row can be improved more than in the case that the magnetic body row is disposed at the substantially central section of the clearance between the first magnet row and the second magnet row.

The above and further objects and features will more fully be apparent from the following detailed description with accompanying drawings.

BRIEF DESCRIPTION OF THE DRAWINGS

FIG. 2 is a graph showing the results of a simulation with respect to the torque transmission of the magnetic gear device;

FIG. 4 is a side sectional view showing a configuration example of a magnetic gear device according to Modification Example 2;

DETAILED DESCRIPTION

Embodiment 1

The present invention will be described below in detail on the basis of the drawings showing the embodiments thereof.

Figure 1:
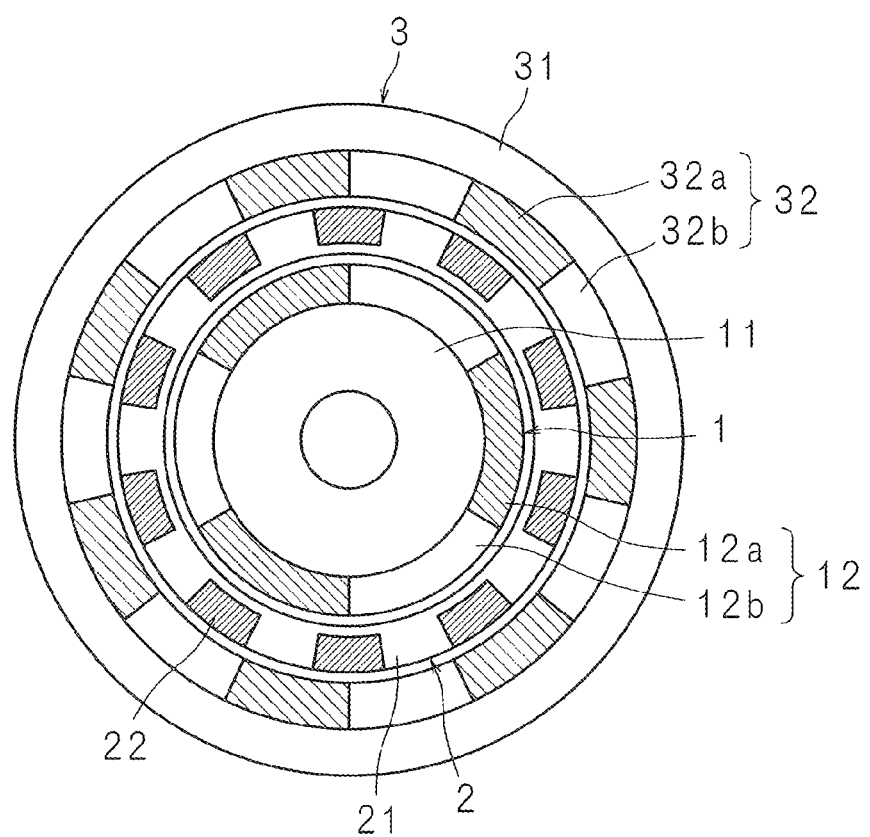
FIG. 1 is a side sectional view showing a configuration example of a magnetic gear device according to Embodiment 1.

FIG. 1 is a side sectional view showing a configuration example of a magnetic gear device according to Embodiment 1. The magnetic gear device according to Embodiment 1 of the present invention is a rotating cylinder type and is equipped with a first movable member 1 having a cylindrical shape, a second movable member 3 having a cylindrical shape and disposed coaxially with the first movable member 1 on the outside thereof with a clearance therebetween, and an intermediate yoke 2 having a cylindrical shape and disposed coaxially with the first movable member 1 and the second movable member 3 with clearances therebetween.

The first movable member 1 has an inner cylindrical section 11 made of magnetic material, and on the outer circumferential face of the inner cylindrical section 11, three magnetic pole pairs 12 are arranged at substantially equal intervals in the circumferential direction, each pair consisting of a magnet 12a with an N-pole on the outer circumferential face side and a magnet 12b with an S-pole on the outer circumferential face side and magnetized in the thickness direction.

The second movable member 3 has an outer cylindrical section 31 made of magnetic material, and on the inner circumferential face of the outer cylindrical section 31, seven magnetic pole pairs 32 are arranged at substantially equal intervals in the circumferential direction, each pair consisting of a magnet 32a with an N-pole on the inner circumferential face side and a magnet 32b with an S-pole on the inner circumferential face side and magnetized in the thickness direction. A magnet being magnetized in the thickness direction means a magnet that is magnetized so that the side of the outer circumferential face and the side of the inner circumferential face are magnetized to opposite polarities. For example, in the magnet 12a, the side of the outer circumferential face and the side of the inner circumferential face thereof are magnetized to an N-pole and an S-pole, respectively, and in the magnet 12b, the side of the outer circumferential face and the side of the inner circumferential face thereof are magnetized to an S-pole and an N-pole, respectively.

Furthermore, since the ratio at which eddy current occurs is higher on a lower speed rotation side than on a high speed rotation side, in the case that the magnetic pole pairs 12 and 32 are made of rare-earth-transition metal-based magnets (for example, Nd—Fe—B-based magnets), it is preferable that the magnetic pole pairs 12 on the side of the first movable member 1 are formed of sintered magnets and that the magnetic pole pairs 32 on the side of the second movable member 3 are formed of bonded magnets. The bonded magnet is obtained by mixing fine magnetic particles or fine magnetic powder with a binder such as a resin and by molding and solidifying the mixture and can reduce the occurrence of eddy current. The sintered magnet is a magnet made by the so-called powder metallurgical process and has the property of producing a strong magnetic force although its eddy-current loss is large compared to the bonded magnet. Hence, with this configuration, the occurrence of eddy current can be suppressed as much as possible while the force exerted between the first movable member 1 and the second movable member 3 is guaranteed.

In the case that an oxide magnet (for example, a ferrite magnet) is used for the magnetic pole pairs 12 and 32, the occurrence of eddy current is very limited; hence, what kind of magnets are to be disposed in the first movable member and the second movable member, i.e. how the magnets are manufactured, may be determined appropriately in consideration of assembly efficiency, cost, etc.

The intermediate yoke 2 has a cylindrical partition 21 for separating the first movable member 1 from the second movable member 3 and holding ten magnetic bodies 22, the number of which corresponds to the number three of the magnetic pole pairs 12 of the first movable member 1 plus the number seven of the magnetic pole pairs 32 of the second movable member three, and the ten magnetic bodies 22 are arranged in the partition 21 at substantially equal intervals in the circumferential direction. In addition, the partition 21 holds the magnetic bodies 22 so that the distance between each magnetic body 22 and the second movable member 3 in the radial direction is shorter than the distance between each magnetic body 22 and the first movable member 1. More specifically, the magnetic body 22 has a shape obtained by cutting a part of a cylinder in the longitudinal direction thereof, and the partition 21 has concave portions formed in the outer circumferential face thereof in which the magnetic bodies 22 are fitted. The intermediate yoke 2 is disposed at the substantially central section of the clearance between the first movable member 1 and the second movable member 3, and the magnetic bodies 22 are fitted in the outer circumferential face of the partition 21 so as to be exposed to the side of the second movable member 3. The surface of the magnetic bodies 22 on the side of the second movable member 3 may be coated as needed.

The intermediate yoke 2 is, for example, manufactured by securing the magnetic bodies 22 to a resin formed into a cylindrical shape (for example, see WO 2009/087408). An alternating magnetic field generated by the magnetic pole pairs 32 and including third harmonic wave components, seventh harmonic wave components and 13-th harmonic wave components intersects with the intermediate yoke 2 in the radial direction. A magnetic metal, a laminated steel plate composed of a plurality of laminated magnetic sheets, and a soft magnetic body formed of a magnetic powder compact, etc. may be used for the magnetic body 22. In particular, a laminated steel plate is preferable as the material of the magnetic body 22 because the steel plate can suppress eddy-current loss.

In the case that the second movable member 3 rotates, the first movable member 1 is rotated by the magnetic interaction between the magnetic pole pairs 12 and the magnetic pole pairs 32 provided for the first movable member 1 and the second movable member 3, respectively. In this case, the first movable member 1, the number of magnetic poles of which is smaller than that of the second movable member 3, is rotated at a rotation speed higher than that of the second movable member 3 in a direction opposite to the rotation direction of the second movable member 3 (see "A Way to Improve Efficiency of Permanent-Magnet Magnetic Gears" by Tetsuya Ikeda, Kenji Nakamura and Osamu Ichinokura, Journal of the Magnetics Society of Japan, 2009, Volume 33, No. 2, Pages 130-134). The ratio Ph/Pl of the number (Ph) of the magnetic pole pairs disposed in the first movable member 1 and the number (Pl) of the magnetic pole pairs disposed in the second movable member 3 is used as the gear ratio of the first movable member 1 with respect to the second movable member 3. Hence, in the case that the second movable member 3 rotates one revolution counterclockwise, the first movable member 1 is rotated 7/3 revolutions clockwise.

Next, the relationship between the disposition of the magnetic bodies 22 and the torque transmission in the magnetic gear device will be described.

FIG. 2 is a graph showing the results of a simulation with respect to the torque transmission of the magnetic gear device. The execution conditions of the simulation are described below. It is assumed that the number of the magnetic pole pairs 12 of the first movable member 1 is seven, that the number of the magnetic bodies 22 of the intermediate yoke 2 is twenty six, and that the number of the magnetic pole pairs 32 of the second movable member 3 is nineteen. The width of the magnetic bodies 22 in the radial direction are 3 mm and the width thereof in the circumferential direction are approximately 4 mm. Furthermore, in the case that the second movable member 3 and the intermediate yoke 2 are fixed and the first movable member 1 is rotated, the torque exerted between the first movable member 1 and the intermediate yoke 2 and between the second movable member 2 and the intermediate yoke 2 is obtained by the simulation. The horizontal axis of the graph shown in FIG. 2 represents the phase of the first movable member 1, and the vertical axis thereof represents the torque exerted between the first movable member 1 and the intermediate yoke 2 and between the second movable member 2 and the intermediate yoke 2.

The solid line in the graph indicates the torque exerted between the second movable member 3 and the intermediate yoke 2, and the broken line indicates the torque exerted between the first movable member 1 and the intermediate yoke 2. Furthermore, the thick line in the graph indicates the torque in the case that the clearance between the first movable member 1 and the intermediate yoke 2 is 2 mm and that the clearance between the second movable member 3 and the intermediate yoke 2 is 1 mm (hereafter referred to as Pattern 1). The intermediate line in the graph indicates the torque in the case that the clearance between the first movable member 1 and the intermediate yoke 2 is 1.5 mm and that the clearance between the second movable member 3 and the intermediate yoke 2 is 1.5 mm (hereafter referred to as Pattern 2). The thin line in the graph indicates the torque in the case that the clearance between the first movable member 1 and the intermediate yoke 2 is 1 mm and that the clearance between the second movable member 3 and the intermediate yoke 2 is 2 mm (hereafter referred to as Pattern 3).

As shown in FIG. 2, Pattern 1 shows the best results in which the torque exerted between the first movable member 1 and the intermediate yoke 2 and between the second movable member 3 and the intermediate yoke 2 is the largest. Pattern 1 indicates the results obtained in the case that the magnetic bodies 22 were disposed closer to the side of the second movable member 3 in which the magnetic pole pairs 32 were arranged at a short pitch. Conversely, Pattern 3 shows the worst results in which the torque exerted between the first movable member 1 and the intermediate yoke 2 and between the second movable member 3 and the intermediate yoke 2 is the smallest. Pattern 3 indicates the results obtained in the case that the magnetic bodies 22 are disposed closer to the side of the first movable member 1 in which the magnetic pole pairs 12 were arranged at a long pitch.

As can be understood from the results of the simulation described above, the transmission torque of the device can be improved more in the case that the magnetic bodies 22 are disposed closer to the side of the second movable member 3 in which the magnetic pole pairs 32 was arranged at the short pitch than in the case that the magnetic bodies 22 are disposed at the center of the clearance between the first movable member 1 and the second movable member 3 or than in the case that the magnetic bodies 22 are disposed closer to the side of the first movable member 1.

The following is the principle that the torque transmission is improved more in the case that the magnetic bodies 22 were disposed closer to the side of the second movable member 3 in which the magnetic pole pairs 32 were arranged at the short pitch. The magnetic pole pairs 12 of the first movable member 1 on the high speed rotation side are arranged at a pitch longer than that in the case of the second movable member 3 on the low speed rotation side. The magnetic flux from the magnets 12a and 12b arranged at the long pitch on the high speed rotation side expands wider than that from the magnets 32a and 32b on the low speed rotation side, and the strong magnetic force generated thereby reaches the second movable member 3. On the other hand, the magnetic flux from the magnets 32a and 32b arranged at the short pitch on the low speed rotation side shrinks in the neighborhood of the second movable member 3, and the strong magnetic force generated thereby tends not to reach the first movable member 1. Hence, in the case that the magnetic fluxes from the magnets 12a, 12b, 32a and 32b are modulated by the magnetic bodies 22 of the intermediate yoke 2, the modulation of the magnetic fluxes performed while the magnetic bodies 22 are disposed closer to the sides of the magnets 32a and 32b on the low speed rotation side is influenced by both the action of the magnetic flux generated by the magnets 32a and 32b on the low speed rotation side which shrinks in the neighborhood and the action of the magnetic flux generated by the magnets 12a and 12b on the high speed rotation side which reaches a far distance, whereby the magnetic fluxes are modulated more strongly; as a result, it is assumed that a larger torque can be transmitted.

In the magnetic gear device according to Embodiment 1, the torque to be transmitted between the first movable member 1 and the second movable member 3 can be improved more than in the case that the magnetic bodies 22 are disposed at the substantially central section of the clearance between the first movable member 1 and the second movable member 3.

In addition, generally speaking, the air friction resistance exerted between the intermediate yoke 2 and each of the first movable member 1 and the second movable member 3 becomes larger as the relative speed of the respective components becomes higher; since the intermediate yoke 2 is disposed closer to the side of the second movable member 3 rotating at low speed, this configuration is preferable in view of the air friction resistance, and the torque transmission can be improved.

In Embodiment 1, the magnetic gear device in which the magnet row on the inside and the magnet row on the outside are used as movable members have been described; however, the magnetic gear device may be configured so that the intermediate yoke 2 is rotated while the magnet row on the inside or on the outside is fixed.

Modification Example 1

Figure 3:
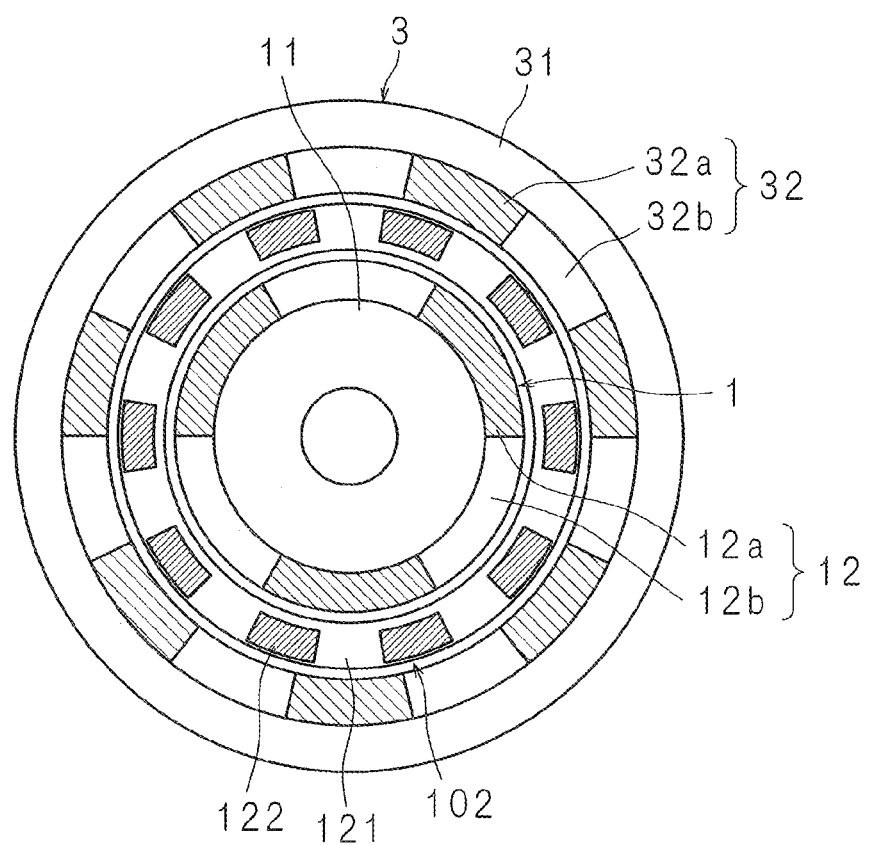
FIG. 3 is a side sectional view showing a configuration example of a magnetic gear device according to Modification Example 1.

FIG. 3 is a side sectional view showing a configuration example of a magnetic gear device according to Modification Example 1. The magnetic gear device according to Modification Example 1 differs from that according to Embodiment 1 in that magnetic bodies 122 are buried in the partition 121 of an intermediate yoke 102.

In Modification Example 1, since the magnetic bodies 122 are exposed neither to the side of the first movable member 1 nor to the side of the second movable member 3, the magnetic bodies 122 can be shut off from the atmosphere on the side of the first movable member 1 and from the atmosphere on the side of the second movable member 3.

Modification Example 2

FIG. 4 is a side sectional view showing a configuration example of a magnetic gear device according to Modification Example 2. The magnetic gear device according to Modification Example 2 differs from that according to Embodiment 1 in that adjacent magnetic bodies 222 with each other, are connected to each other by connection sections 222a. The connection section 222a is a plate that is thinner than the magnetic body 222 in the radial direction, and the connection sections 222a are integrally formed with the plurality of magnetic bodies 222.

In the Modification Example 2, since the plurality of magnetic bodies 222 arranged at substantially equal intervals in the circumferential direction are formed in a state of being connected by the connection sections 222a when an intermediate yoke 202 is produced, the work for arranging the magnetic bodies 222 along a partition 221 can be omitted and the production thereof can be carried out efficiently.

Modification Example 3

Figure 5:
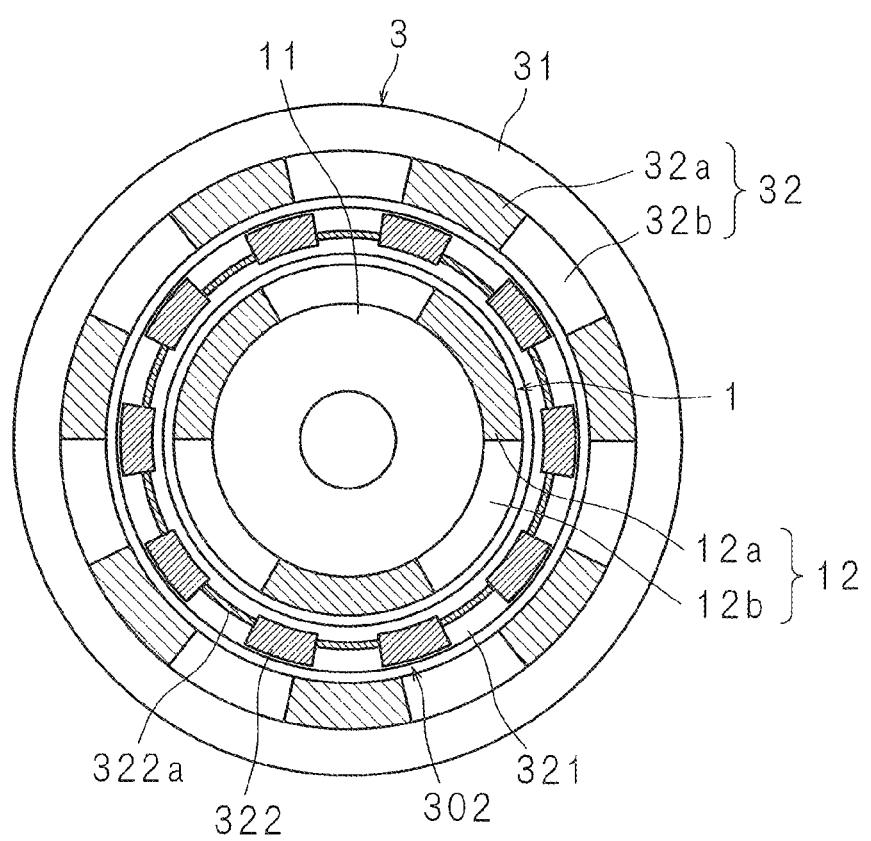
FIG. 5 is a side sectional view showing a configuration example of a magnetic gear device according to Modification Example 3.

FIG. 5 is a side sectional view showing a configuration example of a magnetic gear device according to Modification Example 3. The magnetic gear device according to Modification Example 3 differs from that according to Embodiment 1 in that adjacent magnetic bodies 322 with each other in an intermediate yoke 302 are connected to each other by connection sections 322a and in that the magnetic bodies 322 and the connection sections 322a are buried in a partition 321. The connection section 322a is a plate that is thinner than the magnetic body 322 in the radial direction, and the connection sections 322a are integrally formed with the plurality of magnetic bodies 322.

In Modification Example 3, since the magnetic bodies 322 and the connection sections 322a are exposed neither to the side of the first movable member 1 nor to the side of the second movable member 3, the magnetic bodies 322 and the connection sections 322a can be shut off from the atmosphere on the side of the first movable member 1 and from the atmosphere on the side of the second movable member 3.

Modification Example 4

Figure 6:
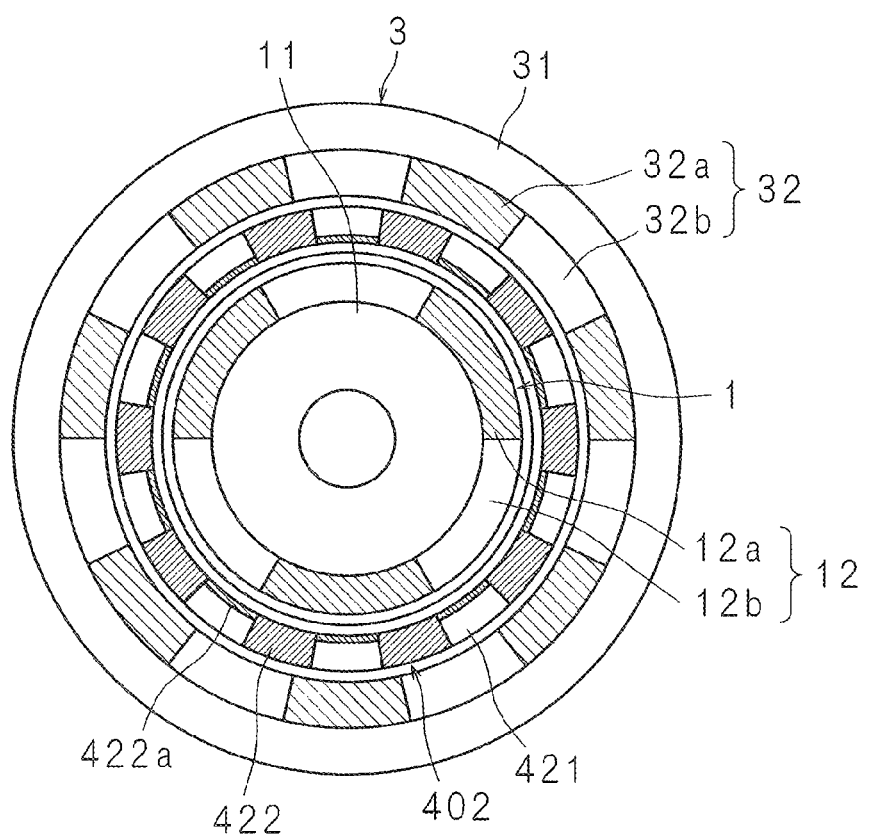
FIG. 6 is a side sectional view showing a configuration example of a magnetic gear device according to Modification Example 4.

FIG. 6 is a side sectional view showing a configuration example of a magnetic gear device according to Modification Example 4. The magnetic gear device according to Modification Example 4 differs from that according to Embodiment 1 in that two of a plurality of magnetic bodies 422, adjacent to each other, are connected to each other by a connection section 422a and in that the connection sections 422a are disposed closer to the first movable member 1 on the high speed rotation side. The connection sections 422a form the shape of a cylindrical plate that is thinner than the magnetic body 422 in the radial direction, and the connection sections 422a are integrally formed with the plurality of magnetic bodies 422.

Since the connection sections 422a are formed so as to extend to both ends of an intermediate yoke 402 in the direction toward the central axis thereof, the connection sections 422a and the magnetic bodies 422 function as a partition for separating the first movable member 1 from the second movable member 3. Also in this case, each of holding members 421 is provided between the magnetic bodies 422 to maintain the positional relationship of the magnetic bodies 422. However, the holding members 421 may be omitted, provided that each of the connection sections 422a used to connect adjacent magnetic bodies 422 with each other has no problem in strength.

In Modification Example 4, since the distance between the connection section 422a and the first movable member 1 is shorter than the distance between the connection section 422a and the second movable member 3, the transmission torque of the magnetic gear device can be improved.

The following is a reason why it is preferable that the connection sections 422a are disposed closer to the side of the first movable member 1 on the high speed rotation side. The magnetic pole pairs 12 of the first movable member 1 on the high speed rotation side are arranged at a pitch longer than the magnetic pole pairs 32 of the second movable member 3 on the low speed rotation side. The amount of the magnetic flux from the magnets 12a and 12b arranged at the long pitch on the high speed rotation side tends to be larger than that from the magnets 32a and 32b on the low speed rotation side.

The connection sections 422a that is used to connect adjacent magnetic bodies 422 serve as a short circuit magnetic path as viewed from the magnets. The short-circuited magnetic flux becomes an invalid magnetic flux not contributing to the interaction between the magnets 12a and 12b on the high speed rotation side and the magnets 32a and 32b on the low speed rotation side. The amount of the invalid magnetic flux is preferably small the better. The short-circuited magnetic flux flows in until the magnetic flux at the connection sections 422a saturated. In other words, since the amount of the invalid magnetic flux generated by the connection sections 422a corresponds to a constant value determined by the cross-sectional area of the connection sections 422a, as the amount of the magnetic flux of the magnet opposed to the magnetic bodies 422 is larger, the ratio of the amount of the invalid magnetic flux to the amount of the magnetic flux is smaller. Hence, the ratio of the invalid magnetic flux can be reduced and the transmission torque can be prevented from lowering by arranging the connection sections 422a on the side of the magnetic pole pairs 32 arranged at the long pitch and by magnetically saturating the connection sections 422a with the magnetic flux from the magnets 12a and 12b.

Modification Example 5

Figure 7:
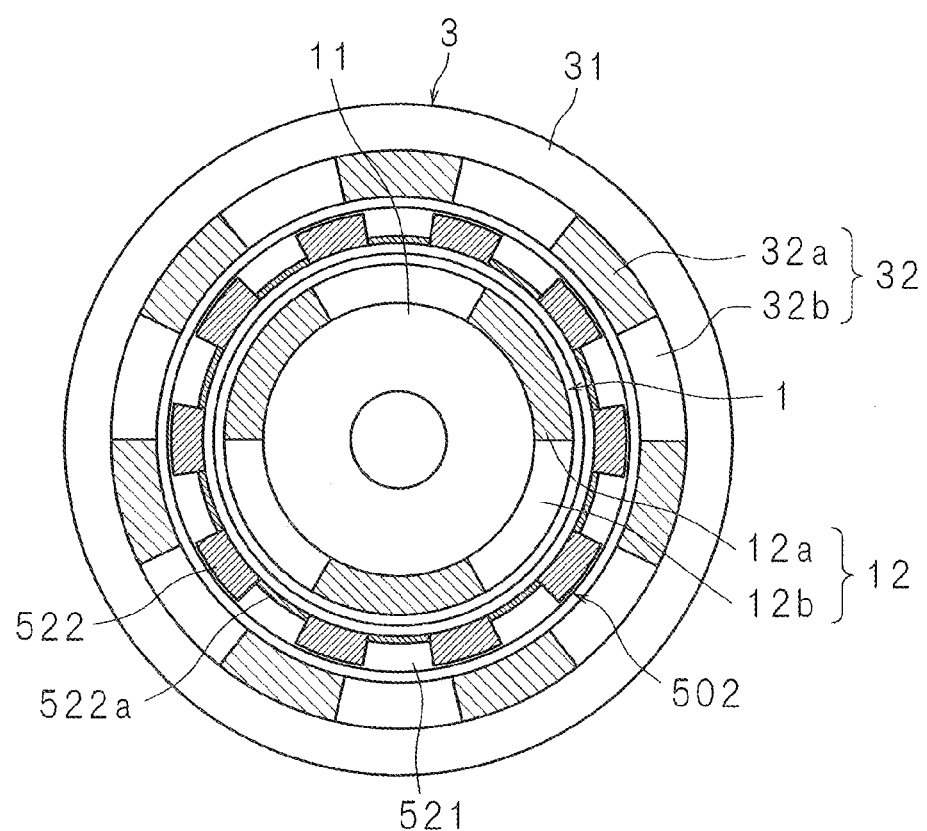
FIG. 7 is a side sectional view showing a configuration example of a magnetic gear device according to Modification Example 5.

FIG. 7 is a side sectional view showing a configuration example of a magnetic gear device according to Modification Example 5. The magnetic gear device according to Modification Example 5 differs from that according to Embodiment 1 in that adjacent magnetic bodies 522 with each other in an intermediate yoke 502 are connected to each other by connection sections 522a, in that the connection sections 522a are disposed closer to the first movable member 1 on the high speed rotation side, and in that the magnetic bodies 522 and the connection sections 522a are buried in a partition 521. The connection sections 522a form the shape of a cylindrical plate that is thinner than the magnetic body 522 in the radial direction, and the connection sections 522a are integrally formed with the plurality of magnetic bodies 522.

In Modification Example 5, the magnetic bodies 522 and the connection sections 522a can be shut off from the atmosphere on the side of the first movable member 1 and from the atmosphere on the side of the second movable member 3. Furthermore, as described above, the transmission torque of the magnetic gear device can be improved.

Modification Example 6

Figure 8:
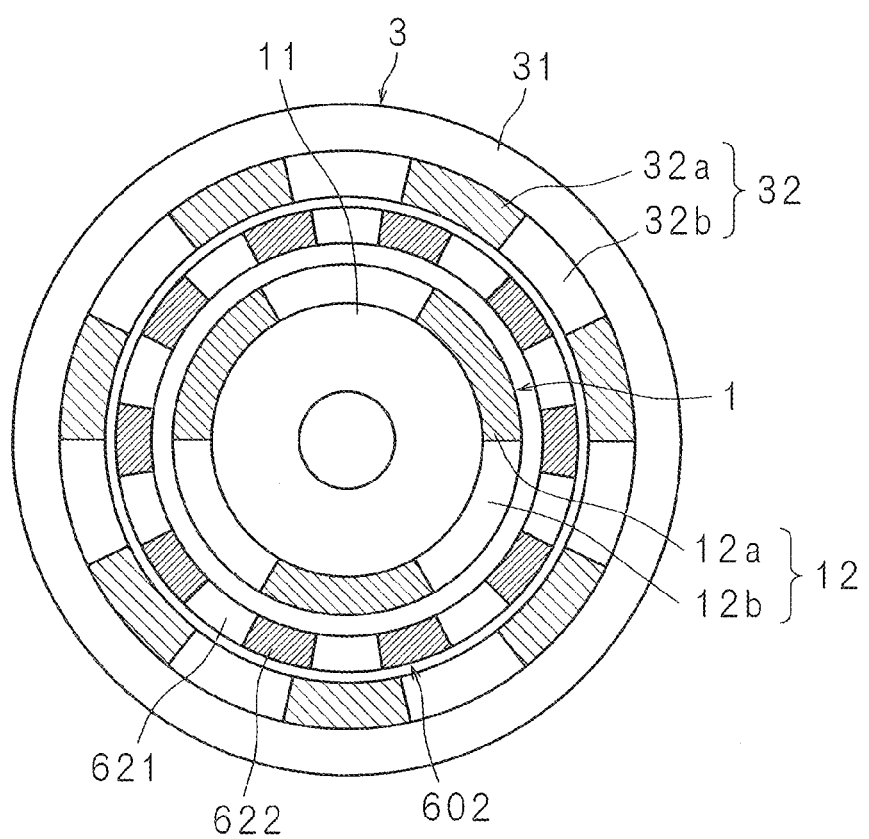
FIG. 8 is a side sectional view showing a configuration example of a magnetic gear device according to Modification Example 6.

FIG. 8 is a side sectional view showing a configuration example of a magnetic gear device according to Modification Example 6. The magnetic gear device according to Modification Example 6 differs from that according to Embodiment 1 in that a plurality of magnetic bodies 622 in an intermediate yoke 602 are held by holding members 621 so as to be arranged at substantially equal intervals in the circumferential direction and in that the magnetic bodies 622 are exposed to both the side of the first movable member 1 and the side of the second movable member 3. Also in this case, the magnetic bodies 622 are disposed closer to the side of the second movable member 3 on the low speed rotation side, whereby the transmission torque of the magnetic gear device can be improved.

Modification Example 7

Figure 9:
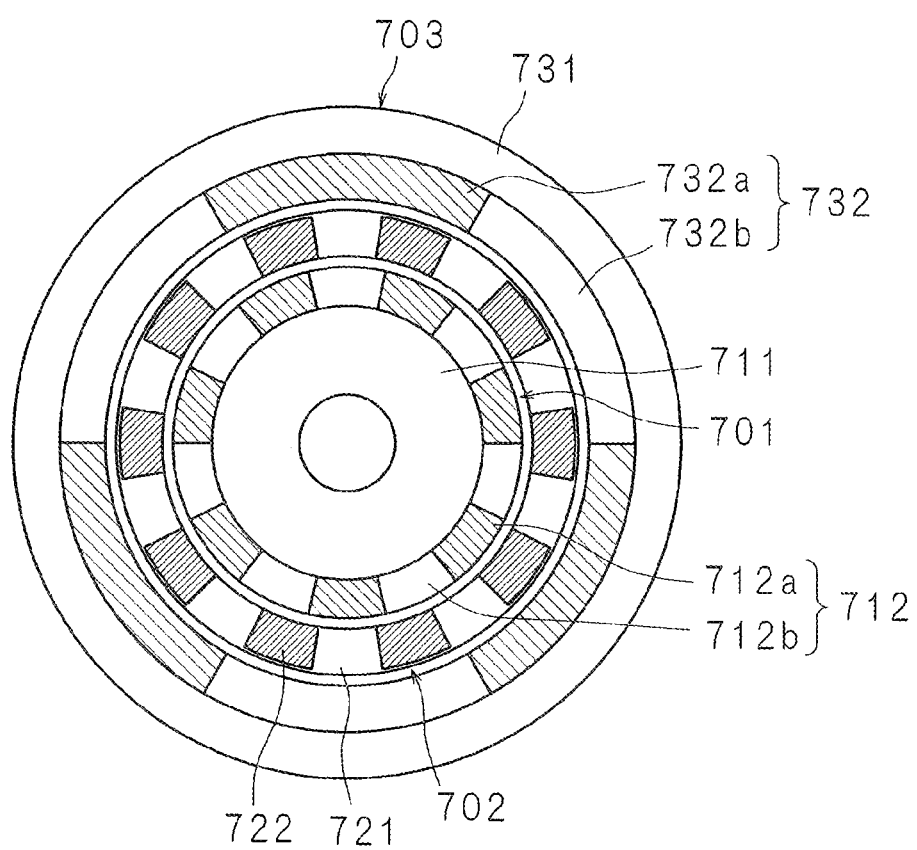
FIG. 9 is a side sectional view showing a configuration example of a magnetic gear device according to Modification Example 7.

FIG. 9 is a side sectional view showing a configuration example of a magnetic gear device according to Modification Example 7. The magnetic gear device according to Modification Example 7 differs from that according to Embodiment 1 in that a first movable member 701 rotates at low speed and a second movable member 703 rotates at high speed.

The first movable member 701 has an inner cylindrical section 711 made of magnetic material, and on the outer circumferential face of the inner cylindrical section 711, seven magnetic pole pairs 712 are arranged at substantially equal intervals in the circumferential direction, each pair consisting of a magnet 712a with an N-pole on the outer circumferential face side and a magnet 712b with an S-pole on the outer circumferential face side and magnetized in the thickness direction. The second movable member 703 has an outer cylindrical section 731 made of magnetic material, and on the inner circumferential face of the outer cylindrical section 731, three magnetic pole pairs 732 are arranged at substantially equal intervals in the circumferential direction, each pair consisting of a magnet 732a with an N-pole on the inner circumferential face side and a magnet 732b with an S-pole on the inner circumferential face side and magnetized in the thickness direction. An intermediate yoke 702 has a cylindrical partition 721 for separating the first movable member 701 from the second movable member 703 and holding ten magnetic bodies 722, and the ten magnetic bodies 722 are arranged in the partition 721 at substantially equal intervals in the circumferential direction. In addition, the partition 721 holds the magnetic bodies 722 so that the distance between each magnetic body 722 and the first movable member 701 in the radial direction is shorter than the distance between each magnetic body 722 and the second movable member 703. In other words, the magnetic bodies 722 are disposed closer to the first movable member 701 on the low speed rotation side.

In Modification Example 7, as in the case of Embodiment 1, the torque to be transmitted between the first movable member 701 and the second movable member 703 can be improved more than in the case that the magnetic bodies 722 are disposed at the substantially central section of the clearance between the first movable member 701 and the second movable member 703.

Modification Example 8

Figure 10:
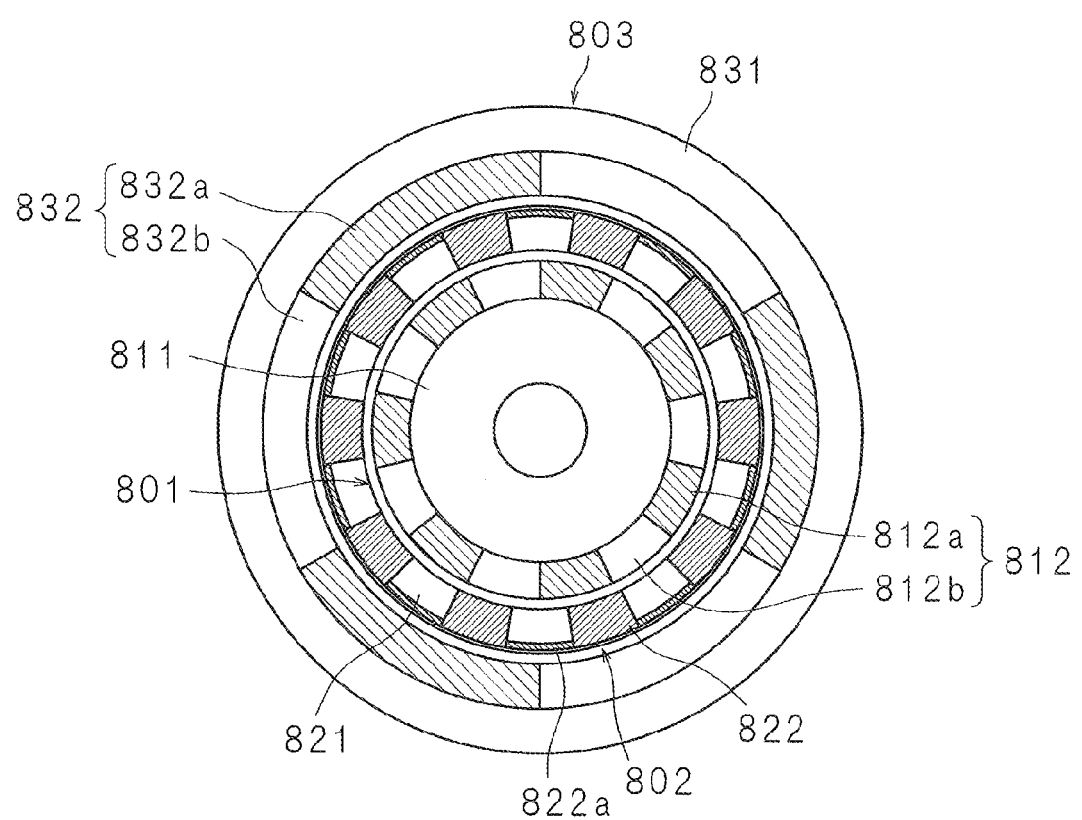
FIG. 10 is a side sectional view showing a configuration example of a magnetic gear device according to Modification Example 8.

FIG. 10 is a side sectional view showing a configuration example of a magnetic gear device according to Modification Example 8. The magnetic gear device according to Modification Example 8 differs from that according to Embodiment 1 in that a first movable member 801 rotates at low speed and a second movable member 803 rotates at high speed as in the case of Modification Example 7 and in that adjacent magnetic bodies 822 with each other are connected to each other by connection sections 822a and in that the connection sections 822a are disposed closer to the second movable member 803 on the high speed rotation side.

The first movable member 801 has an inner cylindrical section 811 made of magnetic material, and on the outer circumferential face of the inner cylindrical section 811, seven magnetic pole pairs 812 are arranged at substantially equal intervals in the circumferential direction, each pair consisting of a magnet 812a with an N-pole on the outer circumferential face side and a magnet 812b with an S-pole on the outer circumferential face side and magnetized in the thickness direction. The second movable member 803 has an outer cylindrical section 831 made of magnetic material, and on the inner circumferential face of the outer cylindrical section 831, three magnetic pole pairs 832 are arranged at substantially equal intervals in the circumferential direction, each pair consisting of a magnet 832a with an N-pole on the inner circumferential face side and a magnet 832b with an S-pole on the inner circumferential face side and magnetized in the thickness direction. In an intermediate yoke 802, ten magnetic bodies 822 being connected by the connection sections 822a are arranged at substantially equal intervals in the circumferential direction. Holding members 821 are provided between the magnetic bodies 822, respectively, to maintain the positional relationship of the magnetic bodies 822. The holding members 821 hold the magnetic bodies 822 so that the distance between each magnetic body 822 and the first movable member 801 in the radial direction is shorter than the distance between each magnetic body 822 and the second movable member 803. In other words, the magnetic bodies 822 are disposed closer to the first movable member 801 on the low speed rotation side.

In Modification Example 8, as in the cases of Embodiment 1 and Modification Example 1, the torque to be transmitted between the first movable member 801 and the second movable member 803 can be improved more than in the case that the magnetic bodies 822 are disposed at the substantially central section of the clearance between the first movable member 801 and the second movable member 803.

In Modification Examples 7 and 8 configured so that the first movable members 701 and 801 are rotated at low speed, the configurations corresponding to Embodiment 1 and Modification Example 4 have been described; however, it is needless to say that configurations corresponding to the other modification examples, that is, Modification Examples 1 to 3, 5 and 6, are also applicable.

Embodiment 2

Figure 11:
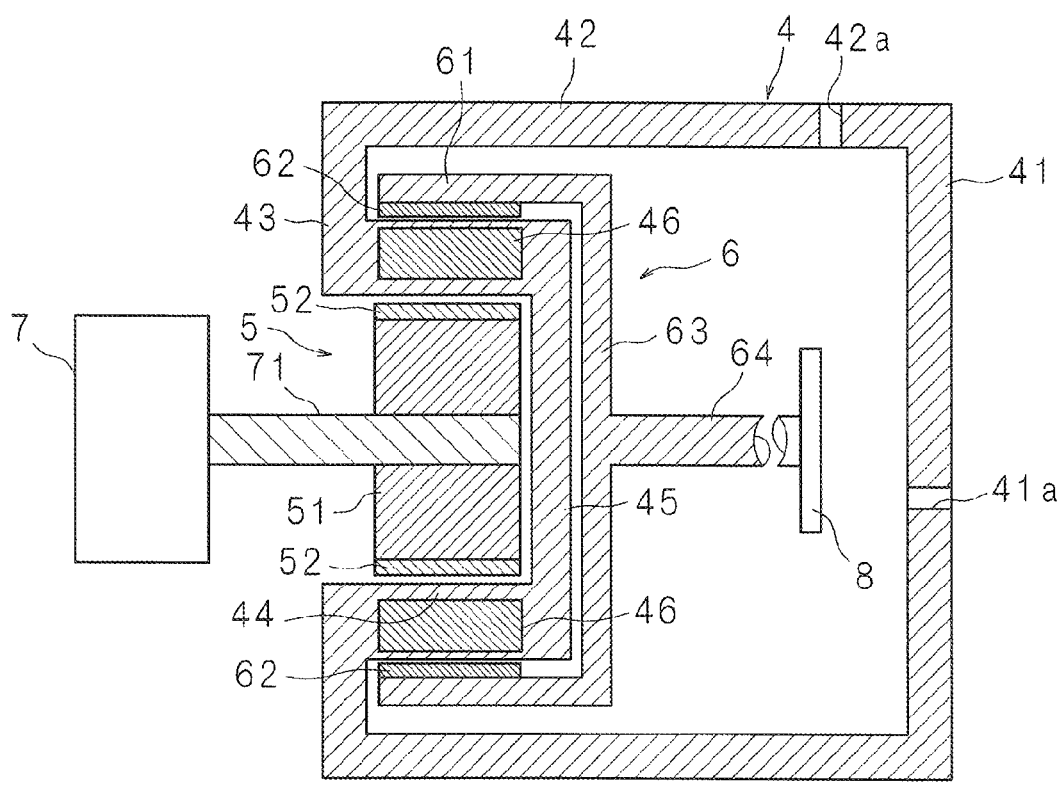
FIG. 11 is a side sectional view showing a configuration example of a magnetic gear device according to Embodiment 2.

FIG. 11 is a side sectional view showing a configuration example of a magnetic gear device according to Embodiment 2. In Embodiment 2, an example in which a magnetic gear device serving as a torque converter is applied to a pump is described. The pump according to Embodiment 2 is equipped with a housing 4 having a substantially bottomed cylindrical shape, one side wall of which is recessed cylindrically. The housing 4 has a cylindrical body 42, a side-wall large-disc section 41 for closing an opening on one side of the cylindrical body 42, an annular section 43 provided on the other side of the cylindrical body 42, a partition 44 having a cylindrical shape and extending from the inner circumferential edge of the annular section 43 to the central side of the cylindrical body 42 in the longitudinal direction thereof, and a side-wall small-disc section 45 provided so as to block the central side of the partition 44. An inlet 41a into which fluid flows is formed in the side-wall large-disc section 41, and an outlet 42a through which fluid flows out is provided at an appropriate position of the cylindrical body 42.

A first movable member 5 and a second movable member 6, each having a cylindrical shape, are disposed coaxially with the partition 44 on the inner circumferential side and the outer circumferential side of the partition 44 constituting the housing 4, respectively, and the movable members are combined with magnetic bodies 46 described later to constitute a rotating cylinder type magnetic gear device.

The first movable member 5 has an inner cylindrical section 51 having a diameter smaller than that of the partition 44, and on the outer circumferential face of the inner cylindrical section 51, three magnetic pole pairs 52 are arranged at substantially equal intervals in the circumferential direction, each pair consisting of a magnet with an N-pole on the outer circumferential face side and a magnet with an S-pole on the outer circumferential face side and magnetized in the thickness direction, as in the case of Embodiment 1. The input shaft 71 of a motor 7 is inserted into the inner cylindrical section 51 and secured thereto.

The second movable member 6 has an outer cylindrical section 61 having a diameter larger than that of the partition 44, and on the inner circumferential face of the outer cylindrical section 61, seven magnetic pole pairs 62 are arranged at substantially equal intervals in the circumferential direction, each pair consisting of a magnet with an N-pole on the inner circumferential face side and a magnet with an S-pole on the inner circumferential face side and magnetized in the thickness direction. A rotating disc section 63 is provided on one end side of the outer cylindrical section 61, that is, on the side of the side-wall large-disc section 41, and an output shaft 64 is provided at the substantially central section of the rotating disc section 63 so that the rotation axis thereof is aligned with that of the input shaft 71. A rotary vane 8 is provided at the tip end of the output shaft 64.

Ten magnetic bodies 46 are buried inside the partition 44 and arranged at substantially equal intervals in the circumferential direction. In addition, the partition 44 holds the magnetic bodies 46 so that the distance between each magnetic body 46 and the second movable member 6 is shorter than the distance between each magnetic body 46 and the first movable member 5 in the radial direction. The partition 44 in which the magnetic bodies 46 are disposed functions as an intermediate yoke.

With the pump configured as described above, the torque of the motor 7 can be transmitted from the first movable member 5 to the second movable member 6 at reduced speed. In addition, since the side of the first movable member 5 is completely isolated from the side of the second movable member 6 by the partition 44, the motor 7 on the side of the first movable member 5 can be prevented from being exposed to the fluid on the side of the second movable member 6. Furthermore, in Embodiment 2, since the magnetic bodies 46 are disposed closer to the second movable member 6 on the low speed rotation side, the transmission torque can be improved in comparison with the conventional technology in which the magnetic bodies 46 are disposed at the substantially central section of the partition 44.

Embodiment 3

Figure 12:
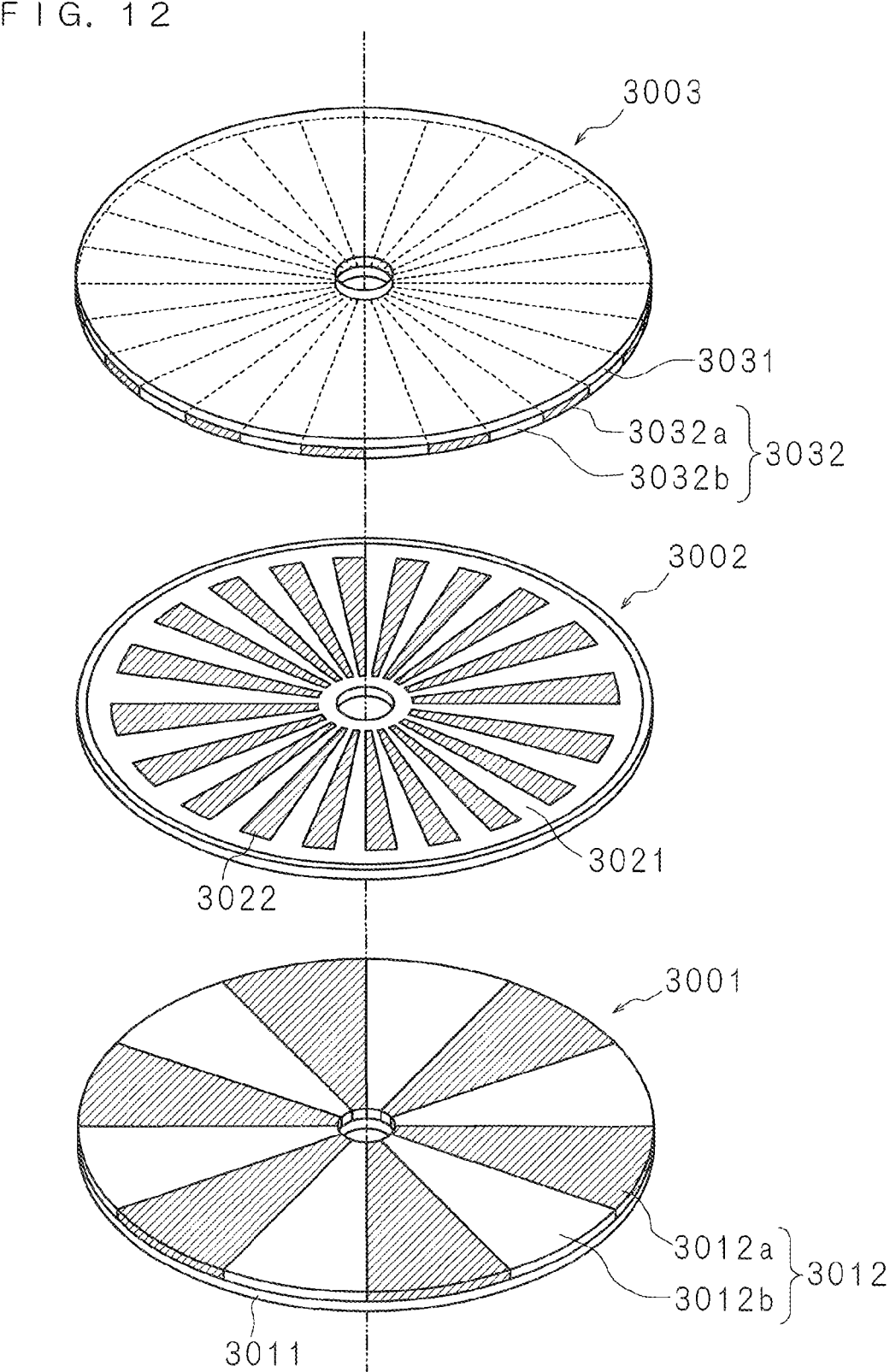
FIG. 12 is an exploded perspective view showing a configuration example of a magnetic gear device according to Embodiment 3.
Figure 13:
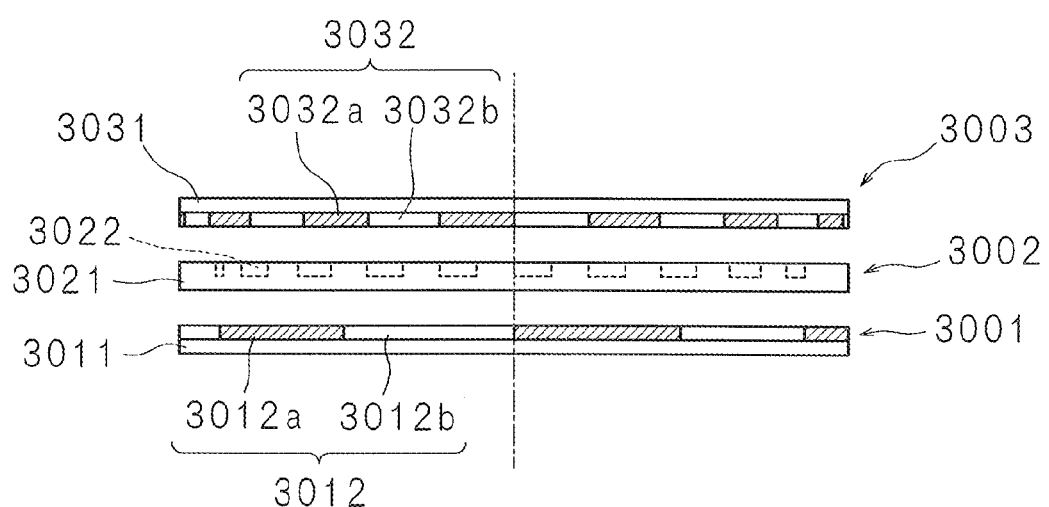
FIG. 13 is a side sectional view showing the magnetic gear device according to Embodiment 3.

FIG. 12 is an exploded perspective view showing a configuration example of a magnetic gear device according to Embodiment 3, and FIG. 13 is a side sectional view showing the magnetic gear device according to Embodiment 3. The magnetic gear device according to Embodiment 3 has a disc shape and is equipped with a first movable member 3001 having a disc shape, a second movable member 3003 having a disc shape and disposed above and coaxially with the first movable member 3001 with a clearance provided therebetween, and an intermediate yoke 3002 having a disc shape and disposed coaxially with the first movable member 3001 and the second movable member 3003 with clearances provided therebetween.

The first movable member 3001 has a first disc 3011 made of magnetic material, and on the upper face of the first disc 3011, six magnetic pole pairs 3012 are arranged at substantially equal intervals in the circumferential direction, each pair consisting of a magnet 3012a with an N-pole on the upper side and a magnet 3012b with an S-pole on the upper side.

The second movable member 3003 has a second disc 3031 made of magnetic material, and on the lower face of the second disc 3031, fourteen magnetic pole pairs 3032 are arranged at substantially equal intervals in the circumferential direction, each pair consisting of a magnet 3032a with an N-pole on the lower side and a magnet 3032b with an S-pole on the lower side.

The intermediate yoke 3002 has a disc-shaped holding member 3021 for holding 20 magnetic bodies 3022, the number of which corresponds to the number (6) of the magnetic pole pairs 3012 of the first movable member 3001 plus the number (14) of the magnetic pole pairs 3032 of the second movable member 3003, and in the holding member 3021, the 20 magnetic bodies 3022 are arranged at substantially equal intervals in the circumferential direction. In addition, the holding member 3021 holds the magnetic bodies 3022 so that the distance between each magnetic body 3022 and the second movable member 3003 in the direction of the rotation axis is shorter than the distance between each magnetic body 3022 and the first movable member 3001.

An effect similar to that of Embodiment 1 is also obtained in the magnetic gear device configured according to Embodiment 3. Furthermore, the technological ideas according to Modification Examples 1 to 8 can also be applied to the magnetic gear device according to Embodiment 3.

Embodiment 4

Figure 14:
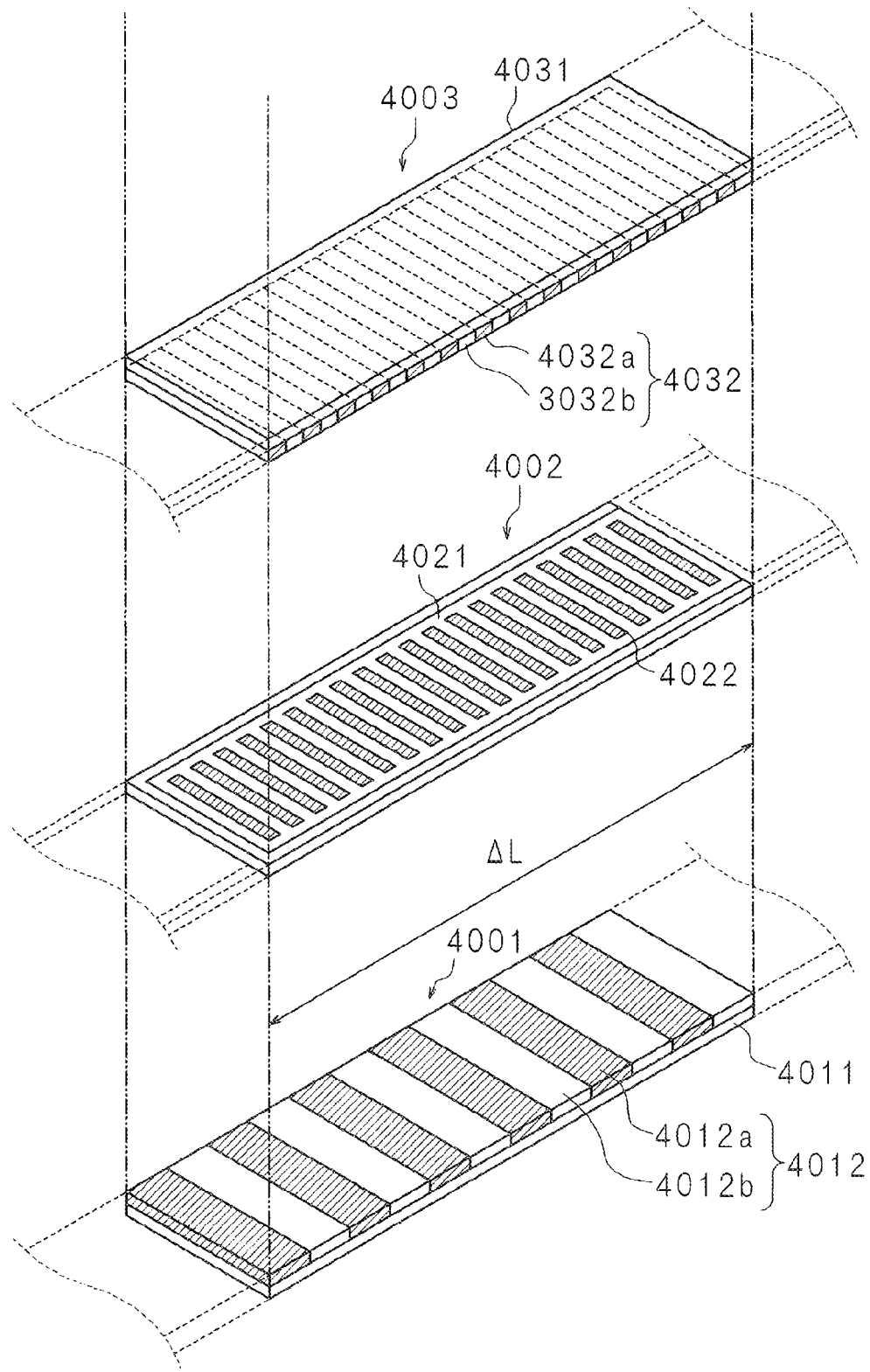
FIG. 14 is an exploded perspective view showing a configuration example of a magnetic gear device according to Embodiment 4.
Figure 15:
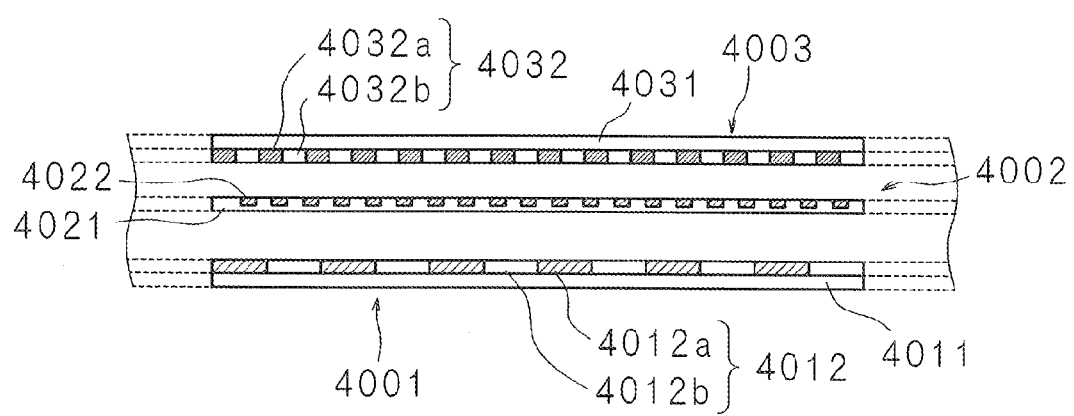
FIG. 15 is a side sectional view showing the magnetic gear device according to Embodiment 4.

FIG. 14 is an exploded perspective view showing a configuration example of a magnetic gear device according to Embodiment 4, and FIG. 15 is a side sectional view showing the magnetic gear device according to Embodiment 4. The magnetic gear device according to Embodiment 4 is a linear type, the components of which are long plates, and the device is equipped with a first movable member 4001 having a long plate shape, a second movable member 4003 having a long plate shape and disposed above the first movable member 4001 with a clearance provided therebetween, and an intermediate yoke 4002 having a long plate shape and disposed between the first movable member 4001 and the second movable member 4003 with clearances provided therebetween. The longitudinal directions of the first movable member 4001, the second movable member 4003 and the intermediate yoke 4002 are substantially aligned with one another.

The first movable member 4001 has a first long plate section 4011 made of magnetic material, and on the upper face of the first long plate section 4011, six magnetic pole pairs 4012 are arranged per unit distance ΔL at substantially equal intervals in the longitudinal direction, each pair consisting of a magnet 4012a with an N-pole on the upper side and a magnet 4012b with an S-pole on the upper side.

The second movable member 4003 has a second long plate section 4031 made of magnetic material, and on the lower face of the second long plate section 4031, fourteen magnetic pole pairs 4032 are arranged per unit distance ΔL at substantially equal intervals in the longitudinal direction, each pair consisting of a magnet 4032a with an N-pole on the lower side and a magnet 4032b with an S-pole on the lower side.

The intermediate yoke 4002 has a long plate shaped holding member 4021 for holding twenty magnetic bodies 4022, the number of which corresponds to the number six of the magnetic pole pairs 4012 of the first movable member 4001 plus the number fourteen of the magnetic pole pairs 4032 of the second movable member 4003, and in the holding member 4021, the twenty magnetic bodies 4022 are arranged per unit distance ΔL at substantially equal intervals in the longitudinal direction. In addition, the holding member 4021 holds the magnetic bodies 4022 so that the distance between each magnetic body 4022 and the second movable member 4003 in the direction of the separation is shorter than the distance between each magnetic body 4022 and the first movable member 4001.

An effect similar to that of Embodiment 1 is also obtained in the magnetic gear device configured according to Embodiment 4. Furthermore, the technological ideas according to Modification Examples 1 to 8 can also be applied to the magnetic gear device according to Embodiment 4.

Embodiment 5

Figure 16:
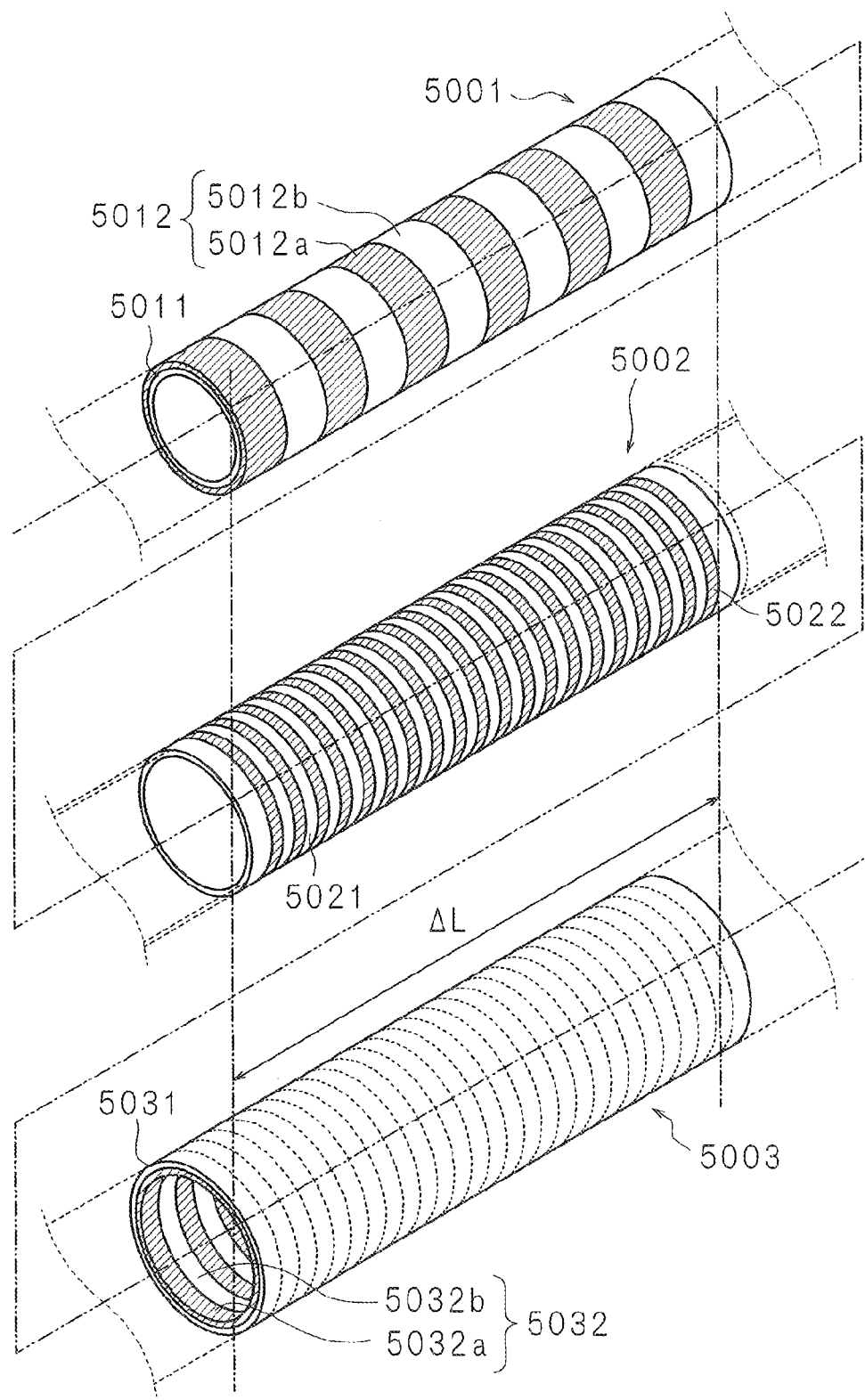
FIG. 16 is an exploded perspective view showing a configuration example of a magnetic gear device according to Embodiment 5.
Figure 17:
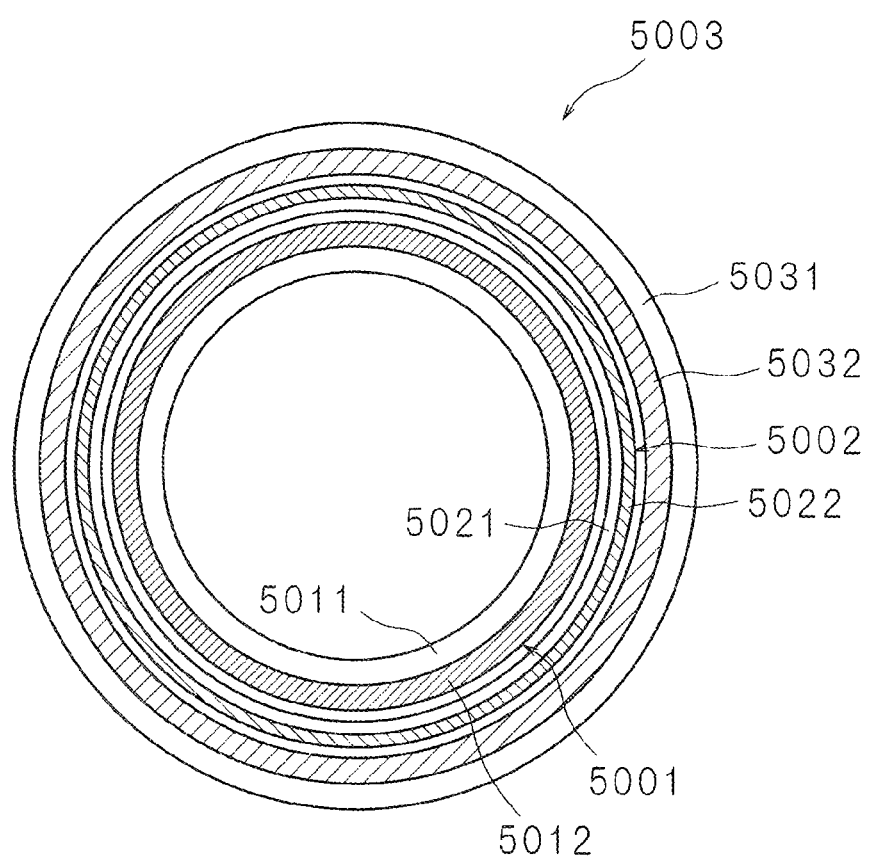
FIG. 17 is a side sectional view showing the magnetic gear device according to Embodiment 5.

FIG. 16 is an exploded perspective view showing a configuration example of a magnetic gear device according to Embodiment 5, and FIG. 17 is a side sectional view showing the magnetic gear device according to Embodiment 5. The magnetic gear device according to Embodiment 5 is a linear type, the components of which are cylindrical, and the device is equipped with a first movable member 5001 having a cylindrical shape, a second movable member 5003 having a cylindrical shape and disposed coaxially with the first movable member 5001 with a clearance provided therebetween on the outer circumferential side thereof, and an intermediate yoke 5002 having a cylindrical shape and disposed coaxially with the first movable member 5001 and the second movable member 5003 with clearances provided therebetween.

The first movable member 5001 has an inner cylindrical section 5011 made of magnetic material, and on the outer circumferential face of the inner cylindrical section 5011, six magnetic pole pairs 5012 are arranged per unit distance ΔL at substantially equal intervals in the direction of the central axis, each pair consisting of a magnet 5012a with an N-pole on the outer side and a magnet 4012b with an S-pole on the outer side.

The second movable member 5003 has an outer cylindrical section 5031 made of magnetic material, and on the inner circumferential face of the inner cylindrical section 5031, fourteen magnetic pole pairs 5032 are arranged per unit distance ΔL at substantially equal intervals in the direction of the central axis, each pair consisting of a magnet 5032a with an N-pole on the inner side and a magnet 4032b with an S-pole on the inner side.

The intermediate yoke 5002 has a cylindrical holding member 5021 for supporting 20 magnetic bodies 5022, the number of which corresponds to the number six of the magnetic pole pairs 5012 of the first movable member 5001 plus the number fourteen of the magnetic pole pairs 5032 of the second movable member 5003, and in the holding member 5021, the 20 magnetic bodies 5022 are arranged per unit distance ΔL at substantially equal intervals in the direction of the central axis. In addition, the holding member 5021 holds the magnetic bodies 5022 so that the distance between each magnetic body 5022 and the second movable member 5003 in the radial direction is shorter than the distance between each magnetic body 5022 and the first movable member 5001.

An effect similar to that of Embodiment 1 is also obtained in the magnetic gear device configured according to Embodiment 5. Furthermore, the technological ideas according to Modification Examples 1 to 8 can also be applied to the magnetic gear device according to Embodiment 5.

The embodiments disclosed herein are mere examples in all aspects and should not be considered as restrictive. The scope of the present invention is not defined in the above description but is defined in claims and includes meanings equivalent to the claims and all modifications in the scope of the claims.

The invention claimed is:
1. A magnetic gear device, comprising:
a first magnet row in which a plurality of magnetic pole pairs are arranged at substantially equal intervals in a specific direction;
a second magnet row which is opposed radially outward to the first magnet row and in which a plurality of magnetic pole pairs are arranged at substantially equal intervals in the specific direction at a pitch shorter than that of the first magnet row; and a magnetic body row which is disposed between the first magnet row and the second magnet row and in which a plurality of magnetic bodies are arranged at substantially equal intervals in the specific direction, wherein a distance between the plurality of magnetic bodies and the second magnet row is shorter than a distance between the plurality of magnetic bodies and the first magnet row, wherein the magnetic body row holds the plurality of magnetic bodies and is equipped with a partition for separating the first magnet row from the second magnet row, and the plurality of magnetic bodies are held in the partition so as to be exposed to a side of the second magnet row.

2. The magnetic gear device according to claim 1, wherein the magnetic body row is equipped with connection sections, each of which is used to connect adjacent ones of the plurality of magnetic bodies with each other, and the plurality of magnetic bodies and the connection sections are integrally formed.

3. The magnetic gear device according to claim 2, wherein the distance between the connection section and the first magnet row is shorter than the distance between the connection section and the second magnet row.

4. The magnetic gear device according to claim 1, wherein each of the plurality of magnetic bodies includes a laminated steel plate.

5. The magnetic gear device according to claim 1, wherein one of the first magnet row and the second magnet row includes a sintered magnet and the other includes a bonded magnet.

6. The magnetic gear device according to claim 1, wherein each of the first magnet row, the second magnet row and the magnetic body row has a cylindrical shape, and the specific direction is a circumferential direction of the first magnet row, the second magnet row and the magnetic body row.

7. The magnetic gear device according to claim 1, wherein each of the first magnet row, the second magnet row and the magnetic body row has a disc shape, and the specific direction is the circumferential direction of the first magnet row, the second magnet row and the magnetic body row.

8. The magnetic gear device according to claim 1, wherein the first magnet row, the second magnet row and the magnetic body row have a long plate shape, and the specific direction is a longitudinal direction of the first magnet row, the second magnet row and the magnetic body row.

9. The magnetic gear device according to claim 1, wherein each of the first magnet row, the second magnet row and the magnetic body row has a cylindrical shape, and the specific direction is a direction of a central axis of the first magnet row, the second magnet row and the magnetic body row.

10. The magnetic gear device according to claim 3, further comprising holding members provided between the magnetic bodies.

* * * * *